(12) United States Patent
Gauker et al.

(10) Patent No.: US 8,291,862 B2
(45) Date of Patent: Oct. 23, 2012

(54) TOP-FILL HUMMINGBIRD FEEDER WITH VERTICALLY OPERATIVE BASE SEALING MECHANISM

(75) Inventors: Andrew Gauker, Shillington, PA (US); Marko Konstantin Lubic, Shillington, PA (US); William R. Vaughn, Jr., Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 13/317,654

(22) Filed: Oct. 25, 2011

(65) Prior Publication Data

US 2012/0132145 A1    May 31, 2012

Related U.S. Application Data

(63) Continuation of application No. 12/213,924, filed on Jun. 26, 2008, now Pat. No. 8,051,803.

(51) Int. Cl.
    *A01K 7/00* (2006.01)
(52) U.S. Cl. .......................................... 119/72
(58) Field of Classification Search ................. 119/52.3, 119/57.9, 51.5, 74, 81, 72; *A01K 39/02*
    See application file for complete search history.

(56) References Cited

U.S. PATENT DOCUMENTS

| | | | |
|---|---|---|---|
| 1,828,048 A | 10/1931 | Jevons | |
| 2,475,207 A * | 7/1949 | Smith | 119/52.2 |
| 2,600,103 A * | 6/1952 | Feck | 119/77 |
| 4,800,844 A | 1/1989 | Van Gilst | |
| RE32,970 E | 7/1989 | Furlani | |
| 4,977,859 A | 12/1990 | Kilham | |
| 5,303,674 A | 4/1994 | Hyde, Jr. | |
| 5,493,999 A * | 2/1996 | Schenck | 119/72 |
| 5,634,429 A * | 6/1997 | Loomis et al. | 119/52.2 |
| 5,947,054 A * | 9/1999 | Liethen | 119/57.9 |
| 5,964,183 A * | 10/1999 | Czipri | 119/52.3 |
| D454,669 S * | 3/2002 | Lieb | D30/125 |
| 6,543,384 B2 | 4/2003 | Cote | |
| 7,000,566 B2 | 2/2006 | Fort, II | |
| 7,201,115 B2 * | 4/2007 | Willinger et al. | 119/464 |
| 7,540,260 B2 * | 6/2009 | Rich et al. | 119/57.9 |
| 7,600,487 B2 | 10/2009 | Stone et al. | |
| 7,610,875 B2 * | 11/2009 | Webber | 119/57.8 |
| 7,685,969 B2 * | 3/2010 | Stone et al. | 119/72 |
| 7,743,732 B2 | 6/2010 | Webber | |
| 7,779,786 B2 * | 8/2010 | Walsh | 119/57.9 |
| 8,011,323 B2 * | 9/2011 | Vaughn et al. | 119/72 |
| 2007/0289540 A1 | 12/2007 | Stone et al. | |
| 2008/0257273 A1 | 10/2008 | Carter et al. | |
| 2010/0192866 A1 * | 8/2010 | McMullen | 119/77 |
| 2010/0251967 A1 * | 10/2010 | Mateer et al. | 119/77 |
| 2011/0011345 A1 * | 1/2011 | LoRocco et al. | 119/72 |

* cited by examiner

*Primary Examiner* — Richard Price, Jr.
(74) *Attorney, Agent, or Firm* — Jacobson Holman PLLC

(57) ABSTRACT

A top-fill hummingbird feeder has a liquid container with a a lower bottom opening which can be screw-threaded into a central collar of a feeding basin. An insert is received within the central collar and is configured to be vertically movable between a first position in which fluid is allowed to flow from the liquid container to the basin, and a second position in which fluid flow from the container to the basin is prevented. Movement of the insert between the two positions is effected by pushing the liquid container toward the basin (the closed position) and by pulling the liquid container away from the basin (the open position). Each movement of the insert has an associated "snap" or gives positive physical feedback which the user can feel that assures the user that the desired fluid flow or fluid sealed position has been achieved.

20 Claims, 10 Drawing Sheets

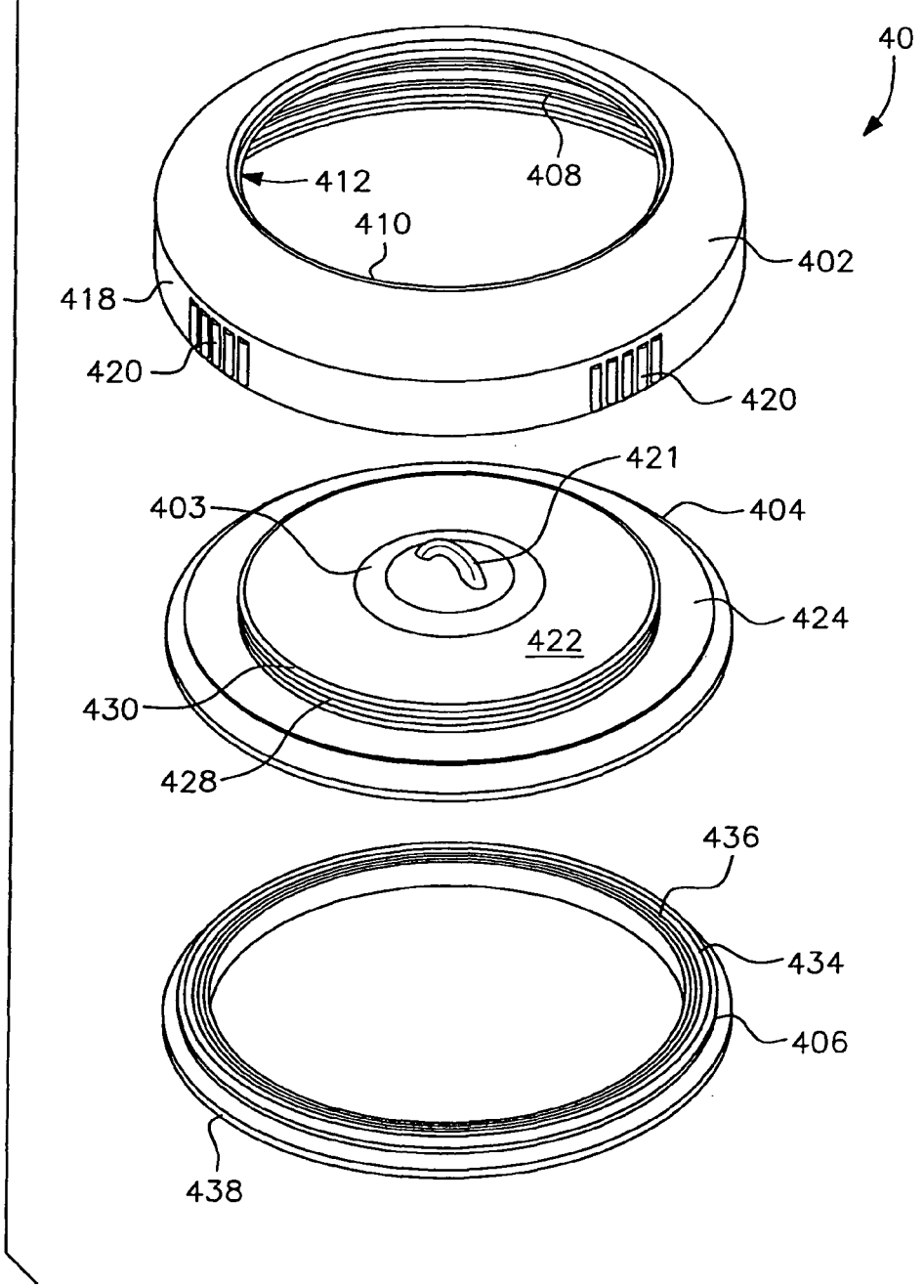

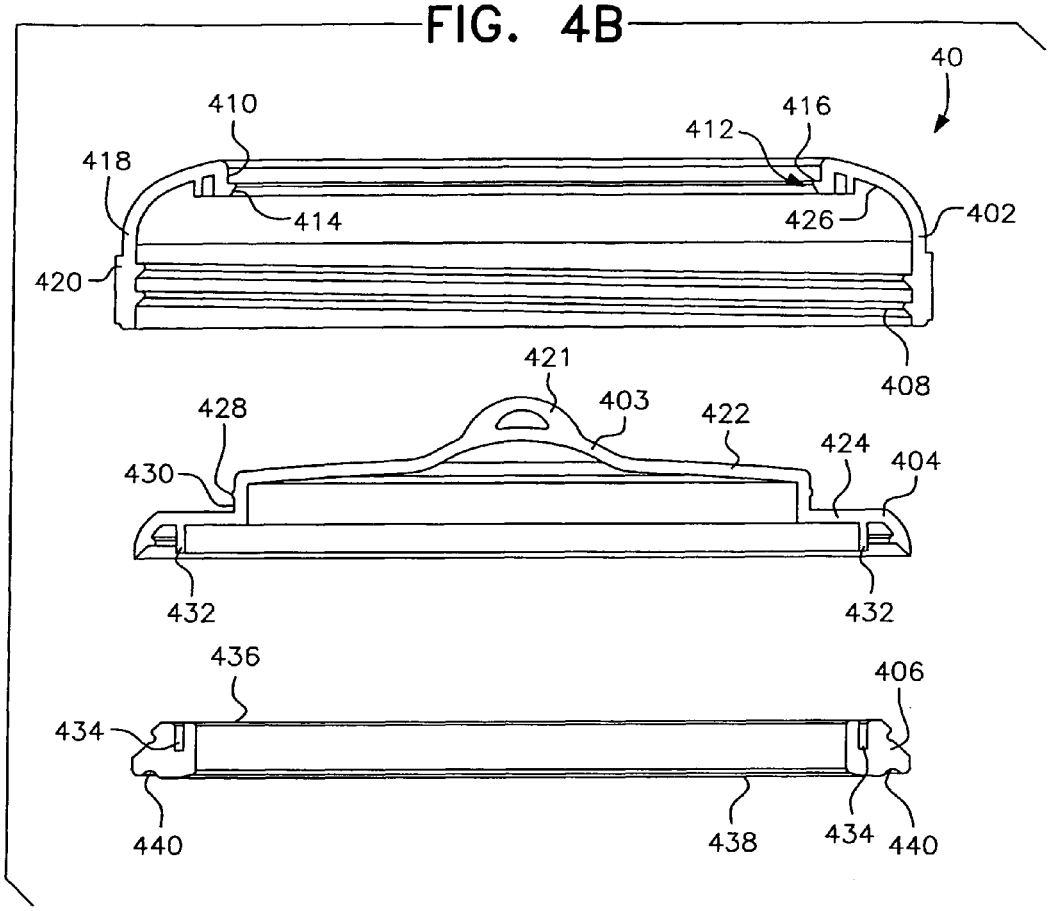
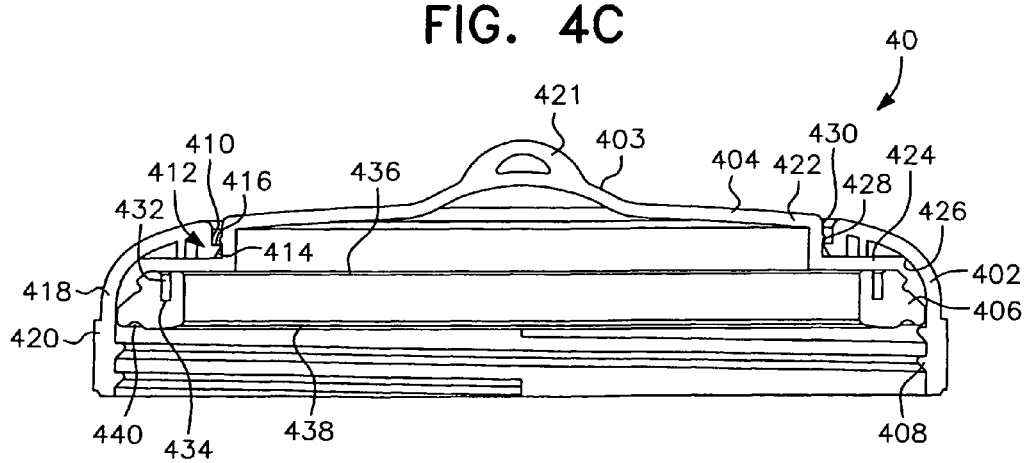

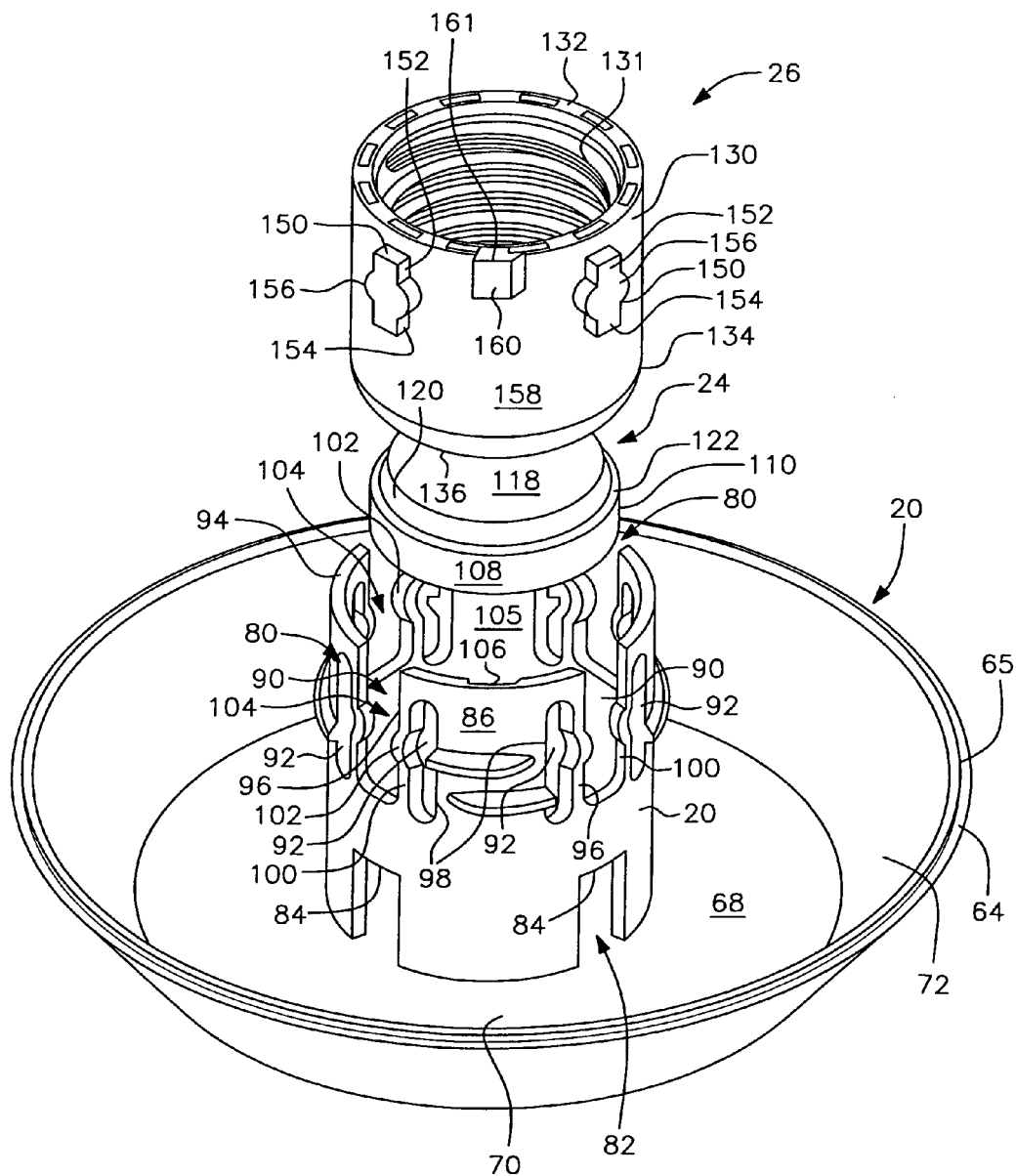

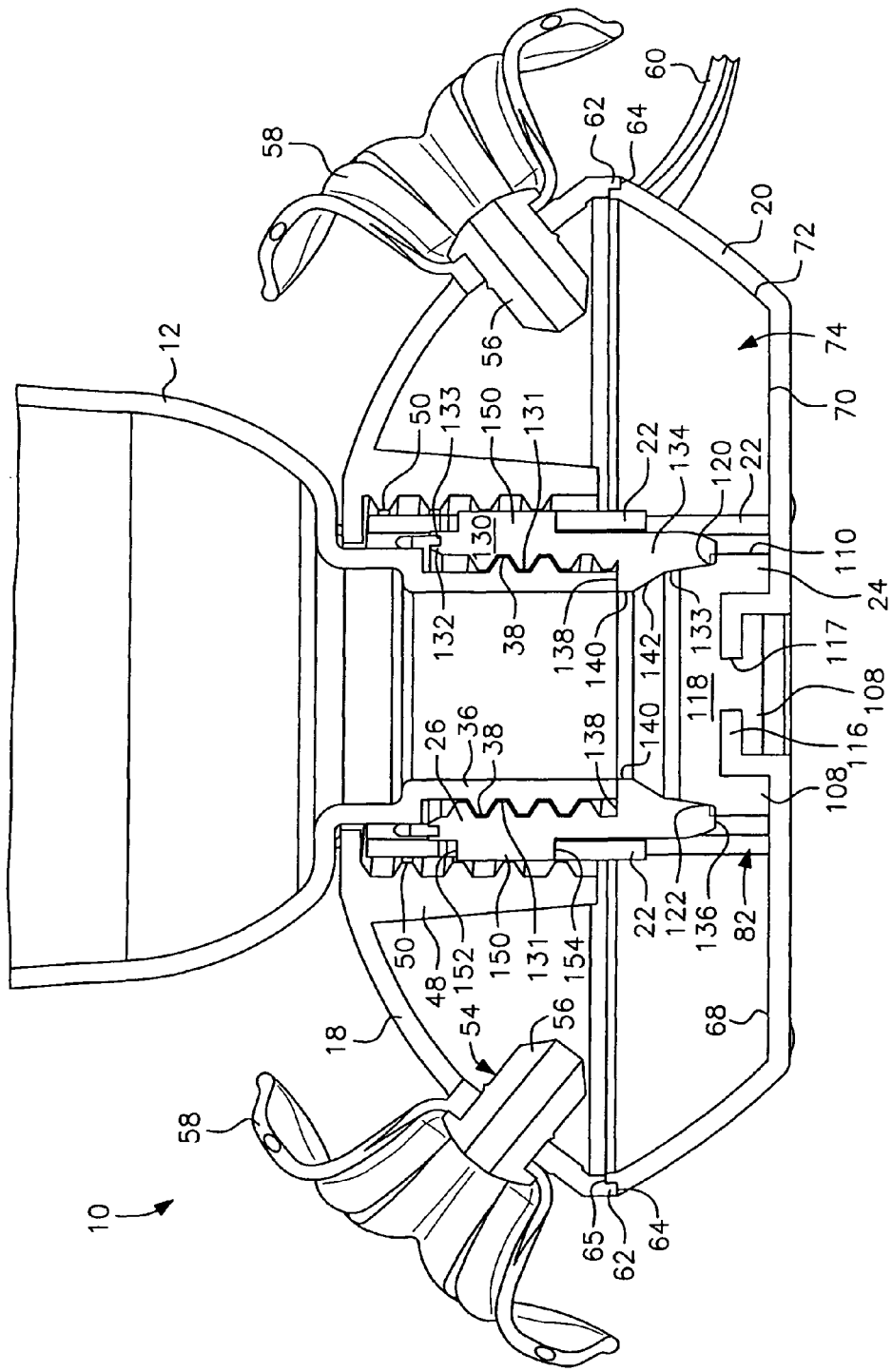

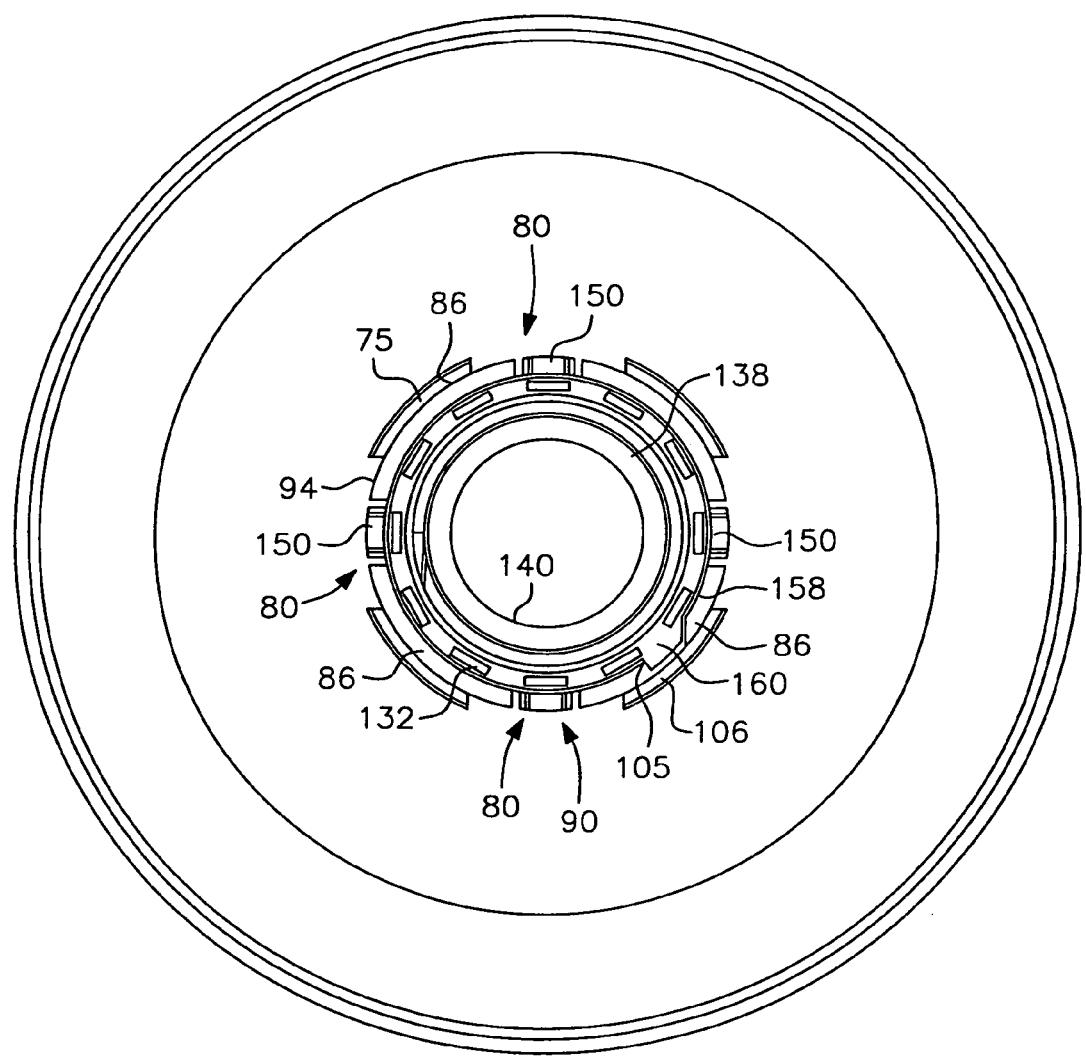

TOP-FILL HUMMINGBIRD FEEDER WITH VERTICALLY OPERATIVE BASE SEALING MECHANISM

This application is a continuation application of application Ser. No. 12/213,924, filed Jun. 26, 2008, issuing as U.S. Pat. No. 8,051,803 on Nov. 8, 2011, the priority of which application is hereby claimed.

BACKGROUND OF THE INVENTION

1. Field of the Invention

The present invention is related to the field of bird feeders and, more particularly, to a top-fill hummingbird feeder.

2. Description of the Related Art

People who live in an area inhabited by hummingbirds frequently try to promote their presence by the use of hummingbird feeders. Hummingbird feeders differ from ordinary bird feeders because hummingbirds feed on nectar or simulated nectar, which are liquid, instead of the seeds or other dry food consumed by most birds from bird feeders. Simulated nectar is typically formed from water sweetened with sugar or honey. In many hummingbird feeders, the nectar (or simulated nectar) is stored in a reservoir and conveyed to simulated flowers where a perch may be provided so that the hummingbird can land and, having a long, slender beak, insert it into the access apertures in the simulated flower and feed.

Most hummingbird feeders have one of two basic designs. One includes an inverted top container which empties into a lower reservoir or feeding basin from which the birds feed. The vacuum at the top of the container (or put another way, the outside air pressure) keeps the liquid in the top container from draining too rapidly out of the feeding basin. The other common feeder design consists of a container with holes in its cover through which the hummingbirds reach to feed. This latter style of feeder suffers from the problem that it must be refilled very often, because the level of food is constantly being reduced by the feeding.

The so-called "vacuum-type" feeders also have problems. For example, they can only be filled by dismantling the feeder and removing the top container from its feeding position. Ordinarily, the consumer must invert the feeder in order to refill it, with the attendant risks of spillage, and requires a certain amount of manual dexterity to create the necessary vacuum. Moreover, because a vacuum is required, these designs are limited to a single opening for filling and cleaning. This opening is typically small, which restricts access to the interior of the container and makes it more difficult to effectively clean the container. Additionally, vacuum feeders can corrode or be inefficient, permitting the nectar to leak and creating an increased risk of insect contamination.

One product which has been available in the market is the Garden Song Top Fill Hummingbird Feeder from Opus Incorporated, now marketed by the assignee of the instant invention. The Opus feeder includes an upstanding liquid container with a large top opening and a small cylindrical lower opening which is screw-threaded into an upstanding cylindrical collar positioned in the center of a feeding basin or liquid tray. The top opening is closed with a cover that seals the container to create a vacuum as the liquid level recedes downwardly in the container. An internal, rotatable ring or valve mechanism has an upstanding cylindrical wall which surrounds the aforesaid cylindrical collar inside the feeding basin.

The wall of the cylindrical collar has a plurality of ports, and the cylindrical wall of the rotatable ring has a plurality of corresponding openings. When the openings in the rotatable ring are aligned with the ports of the collar using an externally accessible lever, nectar can flow out of the container lower opening, through the aligned ports and openings, and into the feeding basin or liquid tray. When the rotatable ring is rotated using the externally accessible lever, so that its openings are not aligned with the ports of the collar, the nectar flow from the container to the feeding base is cut off. In this condition, the cover can be removed from the container top opening for (re)filling the container without nectar in the container flowing out through the collar to flood and overflow the feeding base or liquid tray. This design also permits the top opening to be large enough to facilitate easy cleaning of the bottle. However, the rotational sealing design of the Opus feeder does not provide the user with a positive indication of the feeder having been placed into the open and/or closed positions.

Another top-fill style hummingbird feeder is set forth in co-pending application Ser. No. 11/785,905, also owned by the assignee of the instant invention. This hummingbird feeder includes a generally upstanding reservoir bottle having a large opening at its top end that is sealed by a removable top or cap. The bottom of the bottle or container has a lower bottom opening which can be screw-threaded into a central collar of a feeding basin that has a plurality of feeding ports in a known arrangement. An upwardly biased sealing mechanism is connected to the bottom end of an actuator rod positioned longitudinally down the center of the reservoir bottle. The sealing mechanism and actuator rod are operatively movable between a down position and an up position by screw-threading the removable top onto and off of, respectively, the reservoir bottle top open end. When the actuator rod and the sealing mechanism move to the down position by closing the top cap, the sealing mechanism opens the bottle lower opening and allows the flow of liquid nectar out of the reservoir bottle into the feeding basin. When the actuator rod and sealing mechanism move to the up biased closed position by removing the top cap, the sealing mechanism seals off the bottle lower opening and prevents liquid nectar from flowing out of the bottle into the feeding basin.

SUMMARY OF THE INVENTION

It is an object of the present invention to provide a reliable, consumer-friendly top-fill hummingbird feeder having a liquid-holding container or bottle with a large open top for easy top filling and cleaning of the container.

Another object of the present invention is to provide a top-fill hummingbird feeder in which the liquid-holding container or bottle does not have to be inverted after filling in order to create a vacuum to control flow of the liquid nectar to the feeding basin or liquid tray.

A further object of the present invention is to provide a top-fill hummingbird feeder with a liquid-holding container or bottle having a lower bottleneck opening and with a sealing mechanism for the bottleneck opening which is actuated by moving the liquid container toward or away from the feeding basin.

Still another object of the present invention is to provide a top-fill hummingbird feeder in accordance with the preceding objects, which includes a sealing mechanism having a vertically movable tubular insert coupled to the bottleneck opening and received within an upstanding collar on the base of the feeding basin, the collar having openings therein that are alternately opened and closed by back and forth vertical movement of the tubular insert.

An additional object of the present invention is to provide a top-fill hummingbird feeder in accordance with the preceding objects which has a sealing mechanism that is actuated by vertical movement of the liquid container and which moves between a first fluid flow position and a second fluid sealing position with a positive audible and physical "snap" that assures the user that the desired position has been achieved.

Yet another object of the present invention is to provide a top-fill hummingbird feeder in accordance with the preceding objects, which has components that can be easily manufactured from readily available and known materials and that can be easily assembled for ease and economy of manufacture and easily disassembled and reassembled for easy cleaning and which will be sturdy and long lasting in operation and use.

These and other objects are achieved by a top-fill hummingbird feeder which includes a generally upstanding reservoir bottle or liquid container having a large opening at its upper end. A removable top or cap is screw-threaded onto the upper end to close and seal the upper end opening. The bottom of the bottle or container has a lower bottom opening, preferably in the form of a threaded bottleneck, which can be screw-threaded into a central collar of a feeding basin that has a plurality of feeding ports in a known arrangement. A tubular insert is received within the central collar and is configured to be vertically movable from a first position in which fluid is allowed to flow from the liquid container to the basin, and a second position in which fluid flow from the container to the basin is prevented. Movement of the insert between the two positions is effected by pushing the liquid container toward the basin or by pulling the liquid container away from the basin. Completion of such pushing and pulling movement is accompanied by an associated "snap" or other positive physical feedback which the user can feel to assure the user that the desired fluid flow or fluid sealed position has been achieved.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4A is an exploded view of the components of the cap of the top-fill hummingbird feeder of FIG. 1.

FIG. 4B is an exploded cross-sectional view of the cap components of FIG. 4A.

FIG. 4C is a cross-sectional view of the cap components of FIG. 4B as assembled.

FIG. 5 is an exploded view of the base and sealing mechanism of the top-fill hummingbird feeder of FIG. 1.

FIG. 9 is a cutaway side view of the liquid container, basin and sealing mechanism of the top-fill hummingbird feeder of FIG. 1 in the second closed position in which fluid flow from the container to the basin is prevented.

FIG. 10 is a top view of the base collar of the top-fill hummingbird feeder of FIG. 1 with the tubular insert fitted therein.

DETAILED DESCRIPTION OF THE PREFERRED EMBODIMENTS

Figure 1:
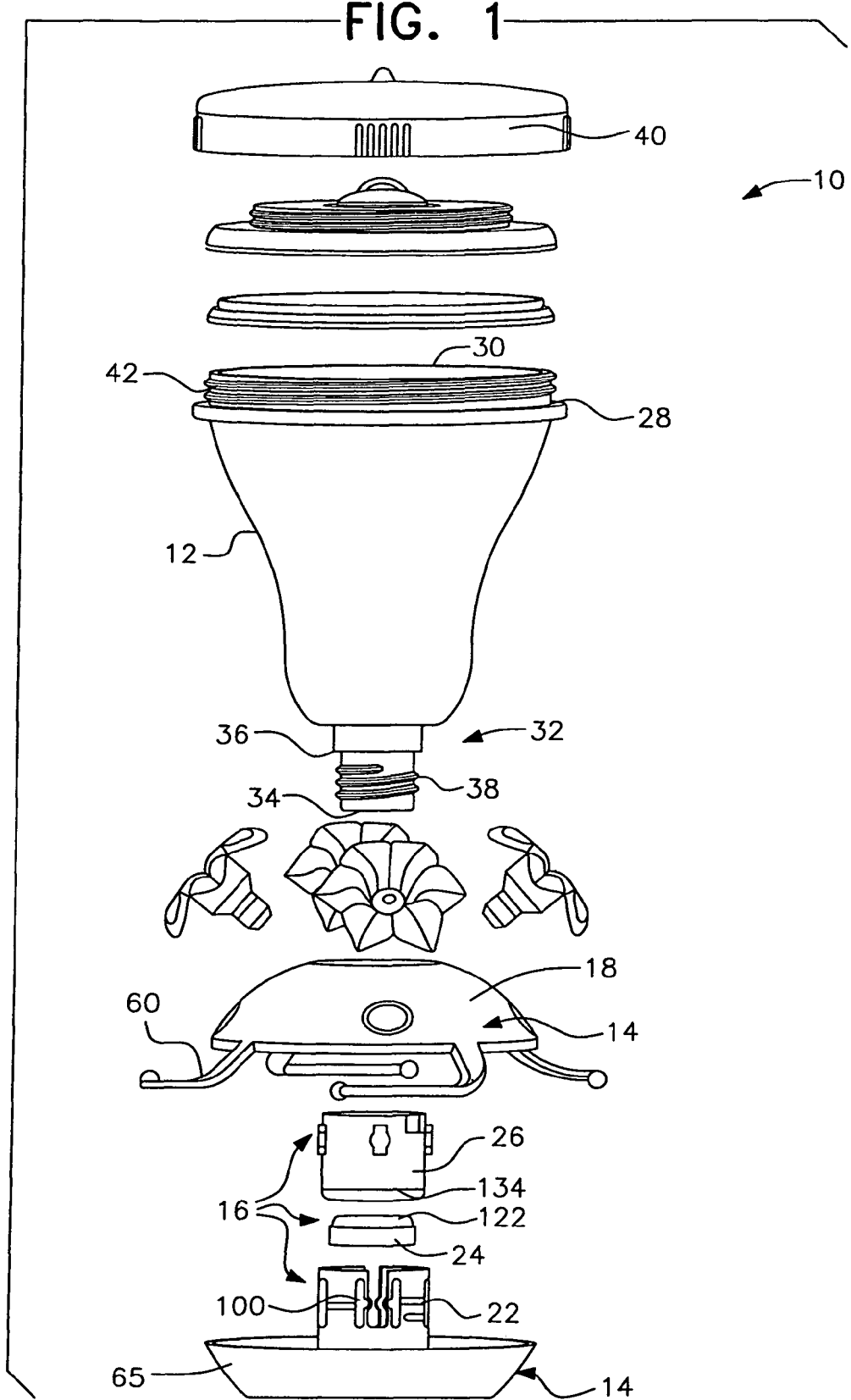
FIG. 1 is an exploded side view of a top-fill hummingbird feeder in accordance with the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 2:
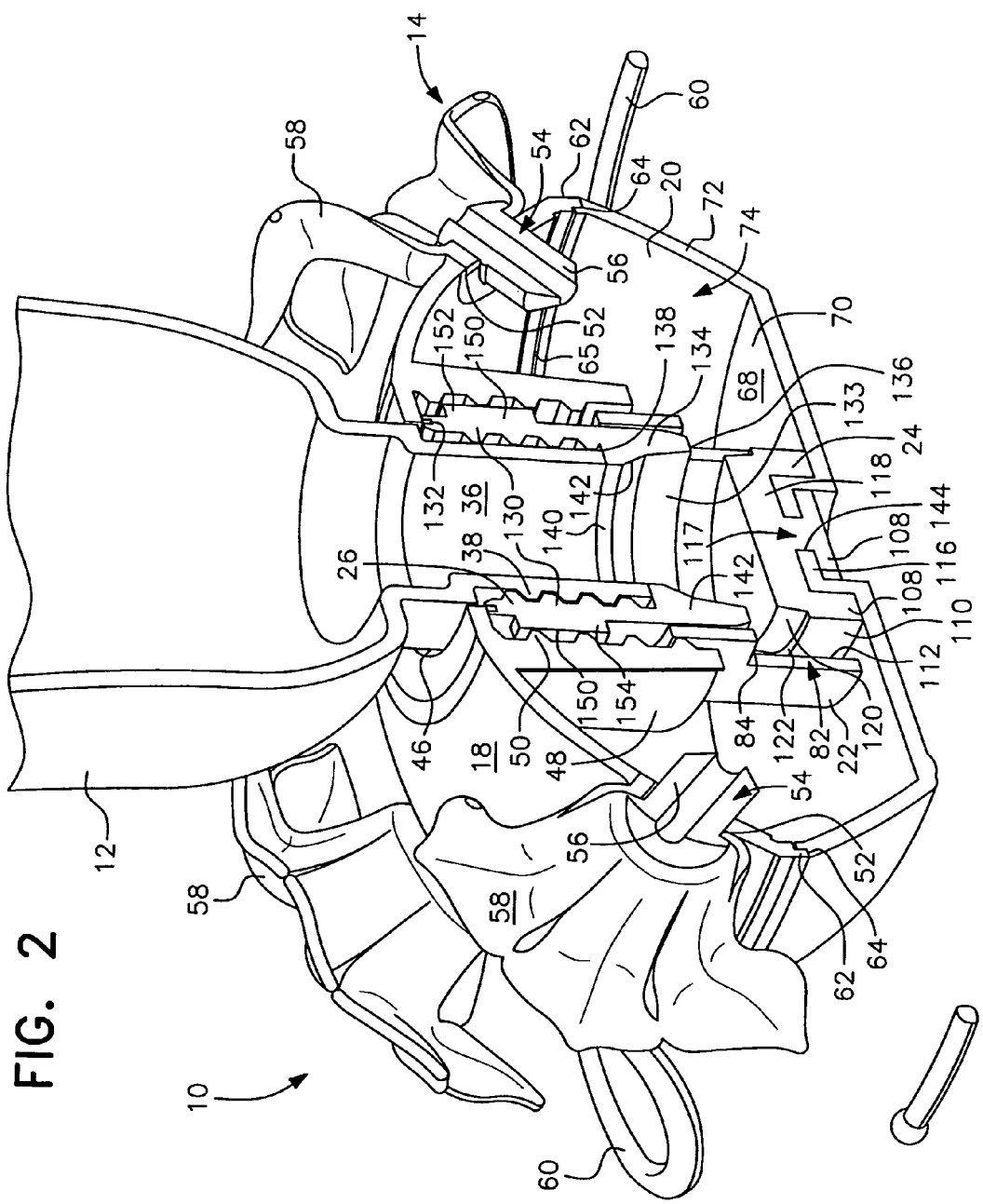
FIG. 2 is a cutaway perspective view of the bottom of the liquid container, the sealing mechanism and the basin of the top-fill hummingbird feeder of FIG. 1 in an assembled condition with the sealing mechanism in the first open position.
Figure 3:
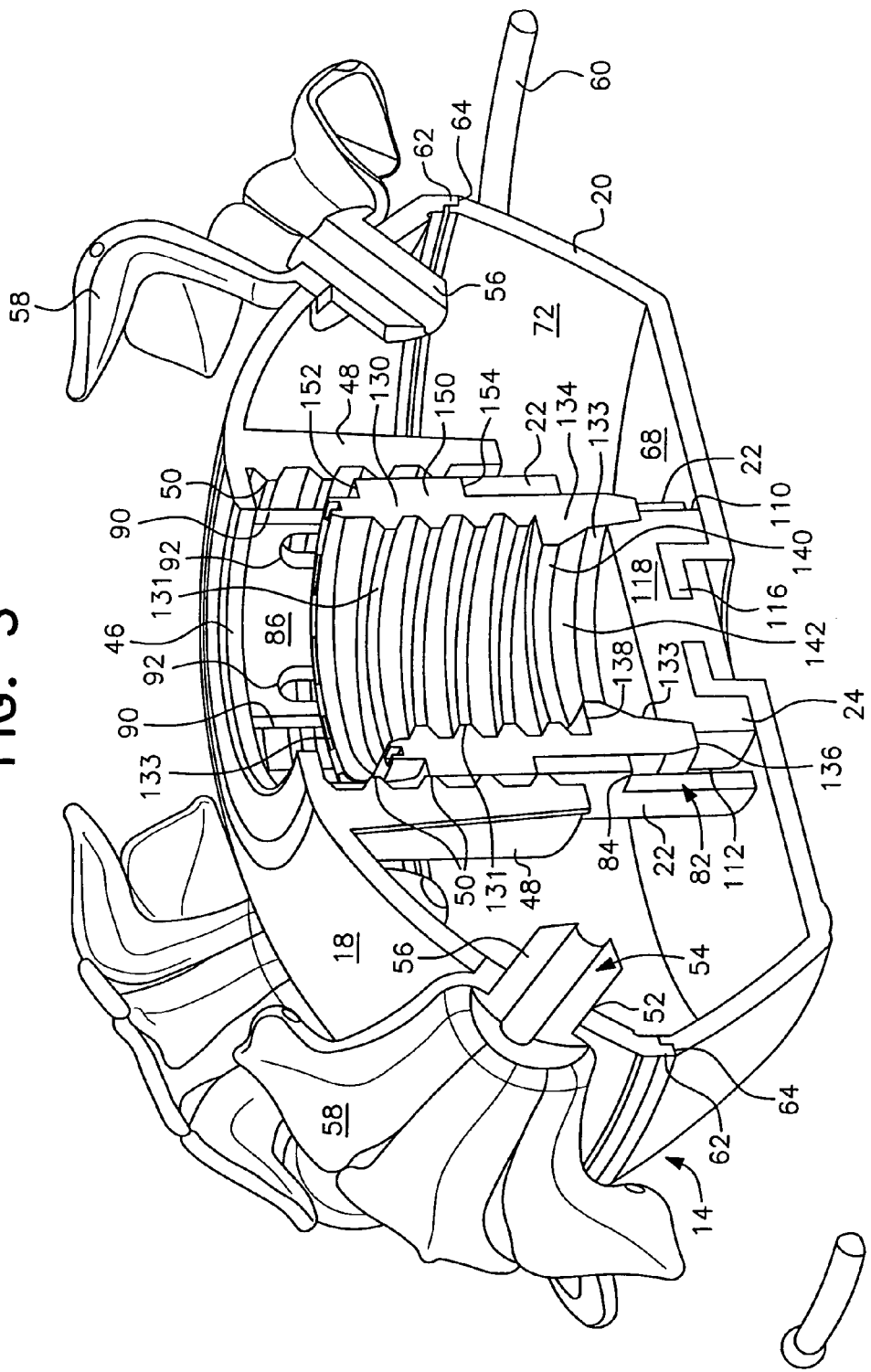
FIG. 3 is a cutaway perspective view of the sealing mechanism and the basin of the top-fill hummingbird feeder of FIG. 1, shown without the liquid container and with the sealing mechanism in the second closed position.

As shown in the exploded view of FIG. 1, the assembled view of FIG. 2, and the partially assembled view of FIG. 3, the present invention is directed to a top-fill hummingbird feeder generally designated by reference numeral 10. The feeder consists of a reservoir bottle or liquid container generally designated by reference numeral 12, a feeding basin generally designated by reference numeral 14, and a sealing mechanism generally designated by reference numeral 16. In accordance with the present invention, the feeding basin 14 includes a cover 18 and a base 20, and the sealing mechanism 16 includes an upwardly extending collar 22, a stopper 24 and a generally tubular insert 26.

The liquid container 12 has an upstanding neck 28 forming a large opening 30 at its upper end for easy filling and cleaning of the liquid container. The bottom of the liquid container, generally designated by the reference numeral 32, has a smaller lower opening 34, preferably in the form of a bottleneck 36 with external threads 38 so that it can be screw-threaded into the tubular insert 26 of the sealing mechanism 16.

A removable top or cap 40 closes off the large opening 30 at the top of the liquid container 12 in a sealed condition. As shown in FIGS. 4A-4C, the removable cap 40 is preferably made of three pieces for ease of manufacture, including a outer shell 402, an inner shell 404 and a ring seal 406.

The outer shell 402 is molded as an annular ring with internal threads 408 that mate with the external threads 42 on the upstanding neck 28 of the liquid container. The outer shell also includes a central opening 410 with an inner flange generally designated by reference numeral 412. The inner flange 412 has a sloped lower surface 414 that tapers from the top 416 of the flange outwardly toward the internal threads 408. As shown in FIG. 4A, the outer surface 418 of the outer shell 402 may be provided with texture elements 420 to facilitate the user's grip when opening and closing the cap 40.

The inner shell 404 has an elevated central portion 422 that fits within the central opening 410, and a rim portion 424 that abuts against the lower surface 426 of the inner shell 402. A raised ring 428 on the outer surface 430 of the central portion 422 rides along the sloped lower surface 414 of the flange 412 when the shells are brought into engagement with one another and then "snaps" into position on the top 416 of the flange 412 when the cap is assembled for use, as shown in FIG. 4C. The top 403 of the inner shell 404 is preferably formed to include a hook or loop 421 to allow the feeder when in use to be suspended from a support structure (not shown) in a hanging configuration.

The ring seal 406 is mounted with a press fit and/or is insert molded over an appropriately shaped structure on an underside of the inner shell. As shown in FIG. 4B, this structure may be embodied as a downwardly projecting ring 432 that is received within a corresponding annular channel 434 in the upper surface 436 of the ring seal 406. The lower surface 438 of the ring seal 406 preferably includes an additional annular channel 440 that receives the upper edge 29 of the neck 28 of the liquid container 12. The mating threads of the removable cap and upstanding neck, together with the ring seal, form an airtight seal when the cap 40 is tightened to close the top of the feeder.

The feeding basin 14 is generally circular in plan view with a cover 18 and a base 20 molded of suitable polymer material. The cover 18 has a central opening 46 from which a downwardly depending collar 48 having inside threads 50 extends toward the base 20. The cover 18 is also molded to include a plurality of openings 52 at spaced locations around the cover periphery for receiving feeding ports, generally designated by reference numeral 54. The feeding ports 54 are preferably molded in one piece with a connecting part 56 to engage the openings with a press or snap fit, along with an ornamental part 58 to enhance the overall appearance of the feeder and increase its attractiveness to the hummingbirds. In the preferred embodiment shown in FIG. 1, the ornamental part 58 resembles flower petals. The cover 18 is also preferably formed with outwardly projecting perches 60 to support the hummingbirds when feeding.

The base 20 includes a bottom 70 and a curved, upwardly directed perimeter base wall 72. The base wall 72 and the bottom define a fluid holding area, generally designated by the reference numeral 74, of the base.

Figure 6:
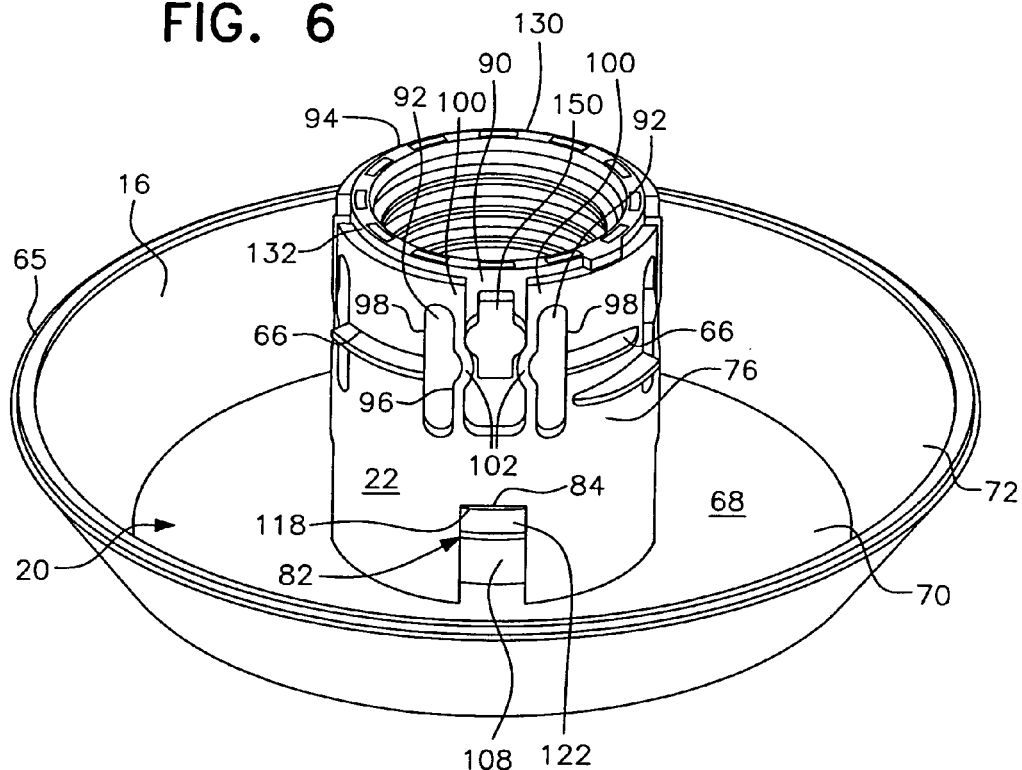
FIG. 6 is a perspective illustration of the base and sealing mechanism of the top-fill hummingbird feeder of FIG. 1 in the first open position in accordance with the present invention.
Figure 7:
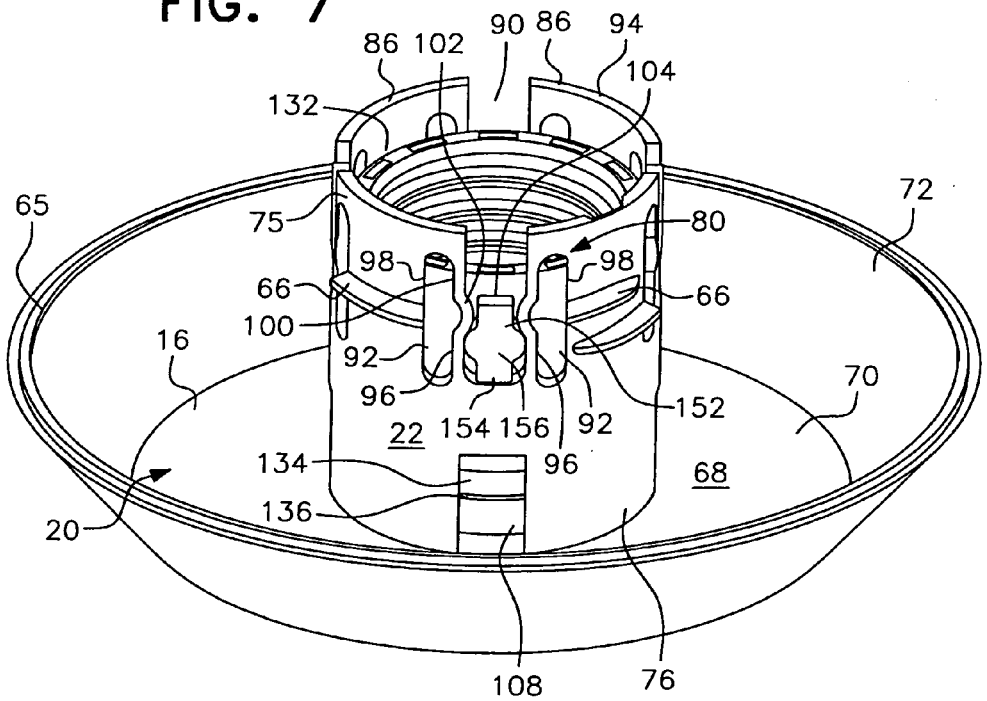
FIG. 7 is a perspective illustration of the base and sealing mechanism of the top-fill hummingbird feeder of FIG. 1 in the second closed position in accordance with the present invention.
Figure 8:
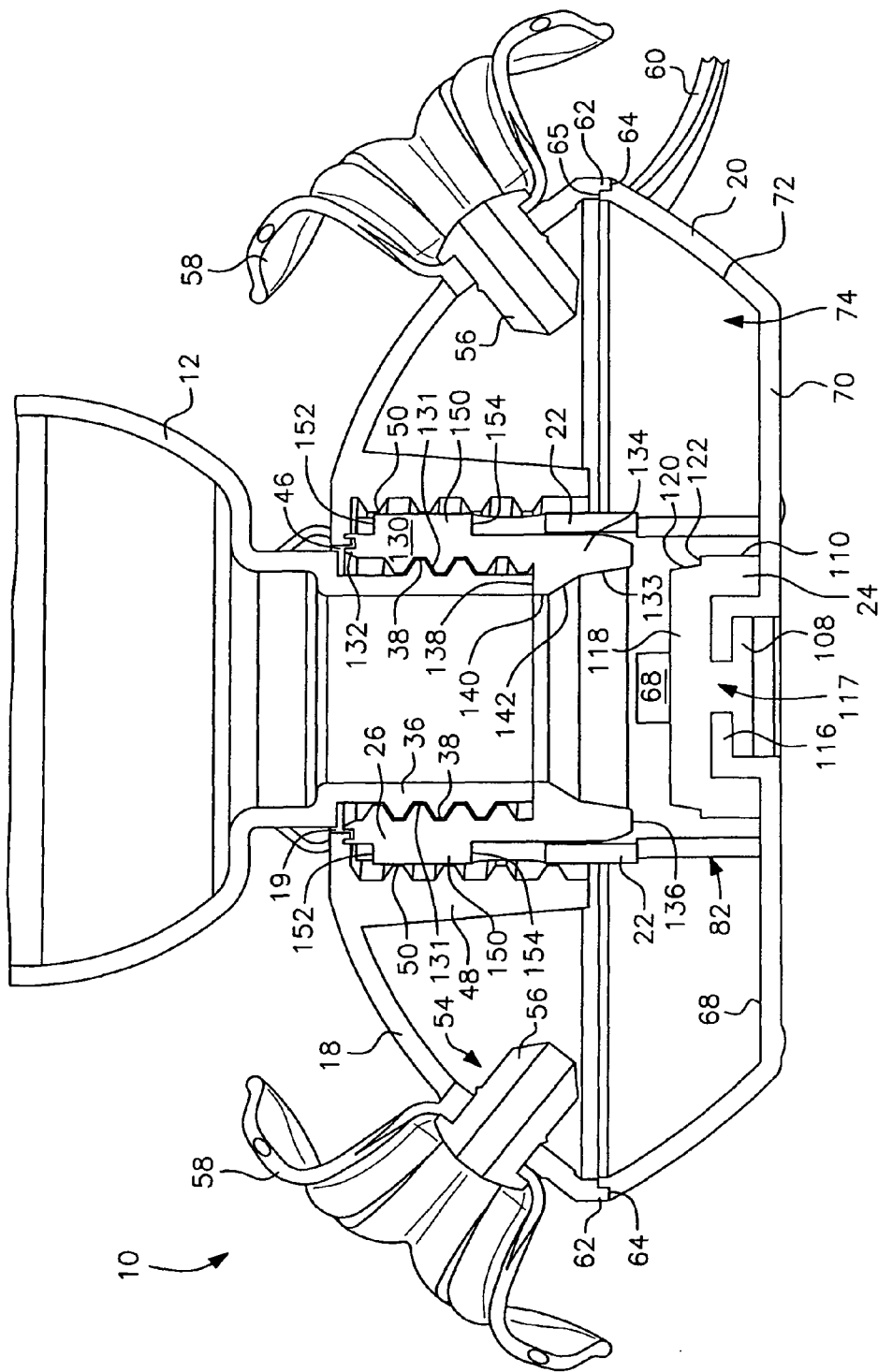
FIG. 8 is a cutaway side view of the liquid container, basin and sealing mechanism of the top-fill hummingbird feeder of FIG. 1 in the first open position in which fluid can flow from the container into the basin.

As shown in FIG. 5, the outer perimeter of the cover 18 has a lip 62 that engages a complementary recess 64 on the upper edge 65 of the base wall 72 to ensure a sealed connection between the cover 18 and base 20 when they are coupled together. This coupling is accomplished through threaded engagement between the inside threads 50 on the downwardly depending collar 48 on the cover 18 with outside threads 66 formed on the upwardly extending collar 22 of the sealing mechanism as shown in FIGS. 6 and 7. The upwardly extending collar 22 of the sealing mechanism 16 is preferably integrally molded with the base 20, but it can be formed separately and then attached to the bottom inner surface 68 of the base 20 in any manner known by persons of ordinary skill in the art to be suitable for sealingly joining plastic parts.

As shown in FIGS. 5-9, the upwardly extending collar 22 of the sealing mechanism 16 is centrally positioned on the bottom surface 68 of the base bottom 70 and projects above the top of the base wall 72. The collar 22 includes a plurality of cutouts or openings formed therein, a first plurality of cutouts generally designated by reference numeral 80 being positioned in the upper region of the collar, and a second plurality of cutouts generally designated by reference numeral 82 being positioned in the lower region of the collar.

The cutouts or openings 82 in the lower region of the collar 22 are referred to as "mouth" openings 82 because they control fluid flow from the liquid container 12 to the basin 14 as will be explained hereinafter. The mouth openings 82 preferably extend upwardly from the base bottom surface 68 so that the bottom of the cutout is open to the bottom surface 68. The top edge 84 of the mouth openings 82 is lower than the peripheral edge 65 of the base wall 72. As shown, the mouth openings 82 are generally rectangular, but other shapes could also be used, such as triangular with the base of the triangle being flush with the base bottom.

As shown in FIGS. 5-7 and 10, the collar 22 also includes a plurality of cutouts, generally designated by reference numeral 80, in the upper region of the collar 22. The cutouts 80 are spaced from one another by solid portions 86 of the collar. Each cutout 80 includes a central elongated cutout, generally designated by the reference numeral 90, flanked on each side by an elongated side cutout 92 having a length substantially equal to that of the central cutout 90. The upper edge of the central cutout 90 is open such that the upper rim 94 of the collar is interrupted or broken by the central cutouts 90. The side cutouts 92 are bounded on all sides by the collar.

Each side cutout 92 includes a notched side 96 adjacent the corresponding central cutout 90 and an opposing side 98 formed by one of the solid portions 86 of the collar. The notched side 96 forms a strip 100 of material having a relatively thin width that allows the strip 100 to be flexed or biased toward the opposing side 98. The center of each strip 100 has a notch 102 that projects into the central cutout 90. Since there are notched strips 100 on each side of the central cutout 90, the result is that the two notches form a "waist", generally designated by the reference numeral 104, in the central cutout. In addition, it is preferable for the width of the central cutout 90 immediately above the notches 102 to be slightly wider than at the upper edge of the central cutout that is open to the upper rim 94 of the collar for reasons that will be discussed hereinafter. According to the preferred embodiment shown, there are four cutouts 80 evenly spaced around the collar.

The inner surface 105 of the collar 22 is generally smooth with the exception of a recess 106 formed in the upper region of one of the solid portions 86 of the collar. This recess 106 is used to properly orient the tubular insert 26 and prevent turning thereof as will be described hereinafter.

Mounted on the bottom 70 of the base 20 and inside the collar 22 is the stopper 24 which functions with the collar and the insert 26 to form the sealing mechanism. The stopper 24 is generally disc-shaped with a lower portion 108 interlocked with the base bottom 70 and having an outer circumference 110 that is smaller than the inner circumference 112 of the collar. The lower portion 108 of the stopper is provided with an annular channel 114 that sealingly interlocks with a stepped structure 116 in the bottom 70 of the base to seal an opening, generally designated by the reference numeral 117, formed in the bottom 70 to receive the stopper 24 (see FIGS. 2, 8 and 9). An upper portion 118 of the stopper has an outer circumference 120 that is smaller than the outer circumference 110 of the lower portion 108 of the stopper 24 to form a shoulder 122, and the overall height of the stopper 24 is less than the height of the mouth openings 82 in the lower region of the collar.

As best seen in FIG. 3, the tubular insert 26 has an internally threaded upper part 130 with threads 131 that opens to an upper insert edge 132, and an unthreaded lower part 134 which opens to a lower insert edge 136. Beginning at the lower insert edge, the diameter of the inner face 133 tapers toward the upper part 130. The upper and lower parts are separated by an annular inner flange 140 that is smaller than the diameter of the inner face 133 of the unthreaded lower part 134. The upper surface 138 of the flange 140 is substantially flat, while the lower surface slopes outwardly to form a sloped surface 142.

The outer surface of the tubular insert 26 includes a plurality of protrusions, generally designated by reference numeral 150, spaced from one another at a distance that corresponds with the spacing of the central cutouts 90 in the upper region of the collar (see FIGS. 6 and 7). Each protrusion 150 is oriented longitudinally with respect to the insert to define an upper end 152 nearest the upper insert edge 132 and a lower end 154 distal from the upper end 152. A center part of each protrusion 150 is wider than the two ends and preferably has a curved, concave shape forming a bulged center part 156. The outer surface 158 of the tubular insert also has a further protrusion or stop 160 whose upper surface 161 is flush with the upper insert edge 132 and generally trapezoidal in cross section (see FIG. 10). This trapezoidal stop 160 is received in the recess 106 formed in the upper region of one of the solid portions 86 of the collar 22 to properly orient the tubular insert 26 and prevent rotational turning of the insert 26 inside the collar 22 as noted earlier. The trapezoidal shape is oriented to provide greatest resistance to turning of the insert 26 in a clock-wise direction to prevent over-tightening of the liquid container 12 when it is threadedly engaged with the insert.

To assemble the sealing mechanism in an embodiment in which the collar is integrally molded with the base, the stopper 24 is first secured to the bottom 70 of the base 20 inside the collar 22. In this position, the upper and lower portions 118, 108 of the stopper are visible through the mouth openings 82 in the lower region of the collar as shown in FIG. 6.

The tubular insert 26 is then positioned for insertion into the collar 22 with the protrusions 150 in alignment with the central cutouts 90 of the cutouts 80 and the stop 160 in alignment with the collar recess 106. When so aligned, the insert 26 can be slid into the collar 22 to a first position where each of the protrusions 150 is received in its respective central cutout 90 and the center bulges 156 rest above the "waist" 104 on the tops of the two notches 102 of the respective strips 100 located on either side of each central cutout 90 (see FIG. 6). In this first position, the upper edge 132 of the insert 26 is approximately flush with the upper rim 94 of the collar. Since the width of the central cutout 90 is slightly greater above the "waist" 104 than at the upper edge by the rim 94, the insert 26 in the first position is prevented from falling out of the collar 22 in response to the force of gravity if the base 20 is inverted.

When in the first position, the outer face 136 of the insert 26 is above the stopper 24 and substantially flush with the upper edge 84 of the mouth openings 82 in the lower region of the collar 22. Hence, there is open fluid flow communication between the inside of the insert and the fluid holding area 74 of the base 20 through the mouth openings 82.

From the first open position, the insert 26 is movable to a second position by applying downward pressure on the insert, forcing it toward the bottom 70 of the base 20. In response to the downward pressure of the bulges 156 on the "waist" 104, the strips 100 forming the notched sides 96 flex outwardly into their respective side cutouts 92, widening the "waist" 104 to allow the bulges 156 to pass into the lower part of the central cutout 90 below the waist. Once the notches 102 are past the narrowest point of the "waist" 104, the insert snaps into the second position shown in FIG. 7 with an audible and physically detectable "snap" or click. The insert is then held firmly in a fixed position by the contact between the bottom of the notches 102 and the upper side of the bulges 156, with the upper insert edge 132 being lower than the upper rim 94 of the collar.

In the second closed position, the sloped surface 142 of the unthreaded lower part 134 of the insert 26 comes into sealing engagement with the stopper 24, with the inner face 133 of the insert fitting over the outer circumference 120 and the lower insert edge 136 engaging the shoulder 122 of the stopper 24. The lower part 134 of the insert 26 can be seen through the mouth openings 82 in the lower region of the collar, along with the lower portion 108 of the stopper, as shown in FIG. 7. Hence, in the second position there is no fluid communication between the inside of the insert and the fluid holding area 74 of the base as the mouth openings 82 are blocked or closed by the relationship between the stopper 24 and the insert 26.

To assemble the remainder of the feeder with the insert 26 in either the first or the second positions, the cover 18 of the basin 14 is secured to the base 20 through threaded engagement between the inside threads 50 on the downwardly depending collar 48 of the cover 18 with the outside threads 66 on the upwardly extending collar 22 of the sealing mechanism. When screwed all the way on, the lip 62 on the outer perimeter of the cover 18 engages the complementary recess 64 on the outer perimeter 65 of the base wall 72 to ensure a sealed connection between the cover and base when they are coupled together.

The basin is now as shown in FIG. 3 and is ready to receive the liquid container 12 which is connected by threaded engagement of the outside threads 38 on the neck 36 of the container with the threads 131 on the threaded upper part 130 of the tubular insert. When fully engaged, the liquid container can be pulled up to move the insert 26 back to the first position, forcing the bulges 156 past the notches 102 of the "waist" 104, or pushed down to move the insert 26 back into the second position, effectively opening and closing the mouth openings 82 in the bottom region of the collar to allow or prevent fluid flow, respectively, from the liquid container into the fluid holding area 74 of the base.

To fill the feeder from an empty state, as when the feeder is first purchased, the user first verifies that the mouth openings are closed by pushing the liquid container downward toward by basin. The movement of the bulges against the "waist" and then past to snap into the lower portion of the central cutouts will produce an audible click or snap; the movement of the bulges past the "waist" can also be felt as a positive stepped movement by the user. The sealing mechanism 16 is thus closed.

With the mouth openings thus closed, i.e., with the insert in the second position, the top cap 40 is removed from the liquid container 12 and the container is filled with fluid, such as hummingbird nectar, through the top opening 30. The sealed condition of the sealing mechanism prevents any fluid from entering the fluid holding area 74. The top cap is then screwed back in place and hand-tightened to form an airtight seal. Supporting the basin 14 with one hand, the liquid container 12 is then pulled upwardly until an audible snap is heard and physical feedback is received indicating that the insert 26 has been moved to the first position, opening the mouth openings. The basin 14 will then automatically fill with nectar from the container as a vacuum forms in the top of the container, and the feeder is ready to use.

As the feeder is in use, the nectar level will be reduced. To top off the feeder or fill an almost empty container, the user closes the mouth openings by pushing the container downwardly toward the basin to move the insert to the second closed position. The top cap 40 can then be unscrewed allowing the container to be refilled through the container top opening 30 without having the basin 14 overflow. When the top cap is resealed, the sealed condition creates a vacuum in the top of the container that prevents the fluid in the fluid holding area from flowing out through the feed ports. The remaining step is the same as with a new feeder, namely pulling the container upwardly to open the mouth openings.

To disassemble the feeder for cleaning, the steps taken to assemble the feeder are reversed. The container is unscrewed from the basin, and then the cover of the basin is unscrewed from the base with a conventional counter-clockwise rotation. The insert is then removed from the collar and all of the parts can be washed in water, preferably with warm soapy water, and then rinsed. Reassembly is then accomplished as discussed above.

The sealed closure of the mouth openings when the insert 26 is in the second closed position allows the container to be refilled through the open top 30 easily and without messy fluid loss. This greatly increases the convenience to the user as compared with hummingbird feeders that have to be inverted for filling. Inversion-fill feeders cannot be "topped off" or fully filled when in a partially filled state without losing all of the liquid nectar still in the base since the base must be turned upside down after filling the reservoir in order to replace the base.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A top-fill hummingbird feeder comprising:
   a liquid container having a top end opening and a bottom end opening, said container being filled through said top end;
   a removable cap for sealing the top end opening;
   a sealing mechanism operatively connected to the bottom end opening, said sealing mechanism including a movable component coupled to a lower end of said liquid container and linearly movable with said liquid container, and a seal element positioned below said movable component;
   a feeding basin having a bottom wall and upwardly directed sidewalls, a connecting element attached to said bottom wall and having an outer wall projecting upwardly from said bottom wall, said connecting element being configured to be movably coupled with said movable component so that said movable component can move relative to said connecting element, said outer wall of said connecting element having mouth openings therein adjacent said fluid basin bottom wall, said feeding basin further having at least one feeding port in liquid flow communication with a fluid holding area inside said basin; and
   said sealing mechanism being activated by vertical movement of said liquid container and movable component so that, when said liquid container is pulled upwardly away from said basin, said movable component is moved to a first position relative to said connecting element in which fluid flow from the liquid container into said fluid holding area through the mouth openings is enabled and, when said liquid container and movable component are pushed downwardly toward said basin, said movable component is moved to a second position relative to said connecting element in which said seal element blocks said mouth openings and prevents fluid flow from the liquid container into said fluid holding area.

2. The hummingbird feeder as set forth in claim 1, wherein said connecting element outer wall includes a first engaging structure and said movable component includes a second engaging structure complementary with said first engaging structure, said first and second engaging structures being operative with one another to define said first and second positions of said movable component.

3. The hummingbird feeder as set forth in claim 2, wherein said first engaging structure includes a longitudinally extending central cutout and said second engaging structure includes a projection sized to be received within said central cutout, said central cutout having a first width portion and a second width portion narrower than said first width portion, said projection being positioned above said second width portion when said movable component is in said first position and being positioned below said second width portion when said movable component is in said second position.

4. The hummingbird feeder as set forth in claim 3, wherein said central cutout is formed in an outer wall of said connecting element, said outer wall further having at least one side cutout positioned on one side of said central cutout and separated from said central cutout by a respective strip of said outer wall, said strip having a notch that projects into said central cutout to form said second width portion.

5. The hummingbird feeder as set forth in claim 4, wherein said strip is flexible so that, when said liquid container with said movable component coupled thereto is pushed downwardly toward said basin, said strip flexes and move sideways into said side cutout, allowing the projection to press past the notch and into the first width portion of the central cutout at which point the movable component is in said second position in which fluid flow from the liquid container into said fluid holding area is prevented.

6. The hummingbird feeder as set forth in claim 1, wherein said movable component of said sealing mechanism is a tubular member and said outer wall of said connecting element is generally cylindrical with an open center into which said tubular member is inserted.

7. The hummingbird feeder as set forth in claim 6, wherein said tubular member has inside threads and is coupled to said liquid container by a threaded engagement with an externally threaded bottleneck of said container that forms said bottom end opening.

8. The hummingbird feeder as set forth in claim 6, wherein said generally cylindrical outer wall of said connecting element forms a collar affixed to the feeding basin base, said mouth openings being formed in side wall of said collar.

9. The hummingbird feeder as set forth in claim 8, wherein said seal element includes an elastic disc having an upper part with a smaller diameter than a lower part to form a shoulder, a lower end of said tubular member having an unthreaded bore with a tapering inner diameter that engages said shoulder in said second position to block fluid flow through said mouth openings in said collar outer wall.

10. The hummingbird feeder as set forth in claim 8, wherein said collar includes a plurality of central cutouts adjacent an upper rim thereof, said tubular member having a corresponding plurality of projections that are sized to be received within said central cutouts.

11. The hummingbird feeder as set forth in claim 10, wherein said collar outer wall has a plurality of side cutouts with at least one side cutout positioned on one side of an associated central cutout and separated from its associated central cutout by a respective strip of said collar wall, each of said strips having a notch that projects into its respective central cutout and is horizontally aligned with the other notches, said projections when initially received in said central cutouts being stopped in said first position by said notches.

12. The hummingbird feeder as set forth in claim 11, wherein said strips are flexible so that, when said liquid container with said tubular member coupled thereto is pushed downwardly toward said basin, said strips flex and move sideways into their respective side cutouts, allowing the projections to press past the notches and into a bottom portion of the central cutout at which point the tubular member is in said second position in which fluid flow from the liquid container into said fluid holding area is prevented.

13. The hummingbird feeder as set forth in claim 8, wherein said collar outer wall further includes a vertically extending recess formed adjacent the upper rim, said tubular member having a corresponding stop that is received in said recess when said tubular member is in said first and second positions, said stop configured to prevent axial rotation of said tubular member within said collar.

14. A top-fill hummingbird feeder comprising:
- a liquid container having a top end opening and a threaded bottleneck forming a bottom end opening;
- a removable cap for sealing the top end opening;
- a movable sealing member having a threaded inner bore by which said sealing member is operatively connected to the threaded bottleneck so as to be movable with said liquid container, said movable sealing member also having at least a first engaging structure on an outer surface thereof, said first engaging structure including a projection;
- a feeding basin having a centrally located and upwardly extending mounting part for receiving said movable sealing member and at least one feeding port in liquid flow communication with a fluid holding area inside said basin; and
- said mounting part including at least a second engaging structure that includes a cutout in said mounting part, said cutout having an upper part and a lower part, positioning of said projection of said movable sealing member in said upper part of said cutout defining a first movable sealing member position in which fluid is able to flow from the liquid container into the fluid holding area, and positioning of said projection of said movable sealing member in said lower part of said cutout defining a second movable sealing member position in which fluid flow from the liquid container into the fluid holding area is prevented, entry into said first and second positions being determined by vertical movement of said container and said movable sealing member toward and away from said feeding basin.

15. The hummingbird feeder as set forth in claim 14, wherein said upper part and said lower part of said cutout are associated with a flexible positioning element configured to stop said projection in said upper part when said movable sealing member is initially received in said mounting part to define said first movable sealing member position, said projection being movable past said flexible positioning element and into said lower part to define said second movable sealing member position through application of sufficient force to push said movable sealing member toward said lower part, causing said positioning element to flex sufficiently to accommodate passage of said projection.

16. The hummingbird feeder as set forth in claim 15, wherein said mounting part is a collar with a wall defining a central area within which said sealing member is received, said flexible positioning element forming a narrowed region in said cutout that defines the upper and lower parts thereof.

17. The hummingbird feeder as set forth in claim 16, wherein a lower region of said collar includes mouth openings in fluid flow communication with the fluid holding area and with said liquid container, said sealing member in said first position being above said mouth openings and in said second position at least partly occluding said mouth openings.

18. The hummingbird feeder as set forth in claim 17, further comprising a rubber stopper mounted in the basin inside the collar and operative with said sealing member to prevent fluid flow in said second position.

19. The hummingbird feeder as set forth in claim 15, wherein said flexible positioning element is a strip of said collar wall bounded on one side by said cutout and on an opposing side by a side cutout formed in said collar wall.

20. The hummingbird feeder as set forth in claim 19, wherein said strip includes a notch that projects into said cutout to form a waist between the upper and lower parts of said cutout, said waist holding said projection in said first position and said strip having sufficient flexibility to flex into said side cutout to allow the projection to move into the lower part in response to pushing pressure on said liquid container.

* * * * *